United States Patent [19]
Larson

[11] Patent Number: 6,141,020
[45] Date of Patent: Oct. 31, 2000

[54] OPPOSING DIRECTIONAL FILL CALCULATORS IN A GRAPHICS PROCESSOR

[75] Inventor: Michael K. Larson, Kirkland, Wash.

[73] Assignee: S3 Incorporated, Santa Clara, Calif.

[21] Appl. No.: 08/968,309

[22] Filed: Nov. 12, 1997

[51] Int. Cl.[7] .................................................. G06F 15/00
[52] U.S. Cl. .......................... 345/501; 345/525; 345/513
[58] Field of Search .......................... 345/418, 441–443, 345/501–506, 520, 521, 523–526, 507, 509, 515, 508, 511, 203, 513; 711/1, 3, 117, 118

[56] References Cited

U.S. PATENT DOCUMENTS

| | | | |
|---|---|---|---|
| 5,170,468 | 12/1992 | Shah et al. ................................ | 345/501 |
| 5,218,674 | 6/1993 | Peaslee et al. ........................... | 345/525 |
| 5,530,799 | 6/1996 | Marsh et al. ............................. | 345/507 |
| 5,559,952 | 9/1996 | Fujimoto .................................. | 345/511 |
| 5,680,572 | 10/1997 | Akkary et al. ........................... | 711/126 |
| 5,706,034 | 1/1998 | Katsura et al. .......................... | 345/508 |
| 5,727,139 | 3/1998 | Owen et al. .............................. | 345/439 |
| 5,748,202 | 5/1998 | Nakatsuka et al. ...................... | 345/514 |
| 5,798,763 | 8/1998 | Larson et al. ............................ | 345/423 |
| 5,801,720 | 9/1998 | Norrod et al. ........................... | 345/526 |
| 5,831,640 | 11/1998 | Wang et al. .............................. | 345/521 |
| 5,903,281 | 5/1999 | Chen et al. ............................... | 345/504 |

*Primary Examiner*—Ulka J. Chauhan
*Attorney, Agent, or Firm*—Fenwick & West LLP

[57] ABSTRACT

A graphics system includes a graphics processor for rendering graphics primitives with a list of display parameters. A host processor generates a display list which includes a XY address for rendering the graphics primitives. A graphics processor which includes internal fetch and store static random access memory (SRAM) devices for storing pixel fetched from an external memory device and processed in the graphics processor respectively. The graphics processor also includes selective pixel data fillers for writing either X or Y position pixel data to the internal SRAM devices. By selectively storing either X or Y position pixel data, the graphics processor is able to perform bit-block data transfers (blts) of pixel data to the internal SRAM thereby efficiently utilizing the local bandwidth of the internal SRAM.

35 Claims, 7 Drawing Sheets

FIG. 3
(PRIOR ART)

| ADDRESS | BYTE1 | BYTE2 | BYTE3 | BYTE4 | BYTE5 | BYTE6 | BYTE7 |
|---|---|---|---|---|---|---|---|
| 00000h | $P_{1,1}$ | $P_{1,2}$ | $P_{1,3}$ | • | • | • | $P_{1,128}$ |
| • | | | | | | | |
| • | | | | | | | |
| • | | | | | | | |
| BF800h | | | | | | | |

FIG. 4
(PRIOR ART)

| ADDRESS | BYTE1 | BYTE2 | • | • | • | BYTE 2048 |
|---|---|---|---|---|---|---|
| 00000h | $T0_{1,1}$ | $T0_{1,2}$ | • | • | • | $T0_{1,2048}$ |
| • | • | • | • | • | • | • |
| • | • | • | • | • | • | • |
| BF800h | $T383_{1,1}$ | $T383_{1,2}$ | • | • | • | $T383_{16,128}$ |

OPPOSING DIRECTIONAL FILL CALCULATORS IN A GRAPHICS PROCESSOR

FIELD OF INVENTION

The present invention relates generally to a graphics system for personal computers. More particularly, the present invention relates to a method and apparatus for providing texture images on a computer screen.

DESCRIPTION OF THE RELATED ART

Sophisticated graphics packages have been used for some time in expensive computer design and graphics systems. Increased capabilities of graphics controllers and display systems, combined with standardized graphics languages, have made complex graphics functions available in even the most routine applications. For example, word processor, spread sheets and desktop publishing packages now include relatively sophisticated graphics capabilities. Three-dimensional (3D) displays have become common in games, animation, and multimedia communication and drawing packages.

The availability of sophisticated graphics in PCs has driven a demand for even greater graphics capabilities. To obtain these capabilities, graphics systems must be capable of performing more sophisticated functions in less time to process greater amounts of graphical data required by modern software applications. In particular, there is a continuing need for improvements in software algorithms and hardware implementations to draw three-dimensional objects using full color, texture mapping and transparency blending.

Improvements have been made in the hardware realm. Graphics processors and accelerators are available with software drivers that interface with a host central processing unit to the graphics processor. In general, the software receives information for drawing objects on a computer screen, calculates certain basic parameters associated with the objects and provides this to the graphics processor in the form of a "display list" of parameters. The graphics processor then uses the display list values in generating the graphics to be displayed. A graphics processor may use interpolation techniques where the fundamental information for the object to be drawn comprises a series of initial and incremental parameters or values. The graphics processor loads or otherwise receives the initial parameters for the pixels to be drawn, interpolate the object by incrementing the parameters until the object is completely drawn.

In many prior art computer systems, peripheral devices such as graphics processors are able to read a stream of data (display list) from memory and execute programs stored in memory external to the graphics processor in a similar manner. The size of these display list information tend to place limitations on the traversal (read/write) speed of the central processing unit and the graphics processor.

FIG. 1 is a simplified block diagram illustrating the major components of a prior art computer system 10 provided with a graphics processor 20. Graphics processor 20 generates pixel data for display 23 at a rate characteristic of the scanning rate of display 23.

Graphics processor 20 is provided with display memory 21 which stores pixel data in text and graphics for output to display 23. Host processor 15 is coupled to graphics processor 20 via system bus 12 for providing display parameter values in the form of a display list and to update the contents of an external memory device such as display memory 21 when a display image to be generated on display memory 21. The graphics processor 20 may include an internal storage device to temporarily store pixel data processed in the graphics processor 20 prior to such pixel data being stored in the external display memory 21. The internal storage device enables the graphics processor to optimally calculate store/fetch operations to pixel data accessed from the external display memory.

Display memory 21 comprises a dynamic random access memory (DRAM) or the like. DRAMs are characteristically organized as a two dimensional array of bit cells divided into rows and columns of bit cells. DRAMs typically replicate these arrays once for each I/O bit. For example, a 16 bit wide DRAM has arrays each of which contributes one data bit. Accessing a row of the array causes that row to be cached in the DRAM. Subsequent accesses to data words in different columns of the same row (column access) are therefore much faster than accesses to different row (row accesses).

Accesses within a row can be made in what is referred to as a page mode access, whereas accesses to different rows may require a page miss or random access memory cycle. A page mode access may take on the order of 2–4 memory clock cycles; whereas a random access may take on the order of 6–9 memory clock cycles. In order to enhance performance of the graphics processor 20, it is preferable to use a DRAM that accesses data in a page mode than in random mode and thus minimize the number of row accesses.

In order to ensure a continued stream of pixel data at the characteristic rate of display 23, the display memory 21 stores the pixel data in a sequential address format.

Although pixel data can be sequentially streamed into display memory 21, the display memory 21 may have characteristic differences such as memory bandwidth utilization, from the internal storage device. For example, graphics processor may have a static random access memory (SRAM) device as the internal storage device. SRAMs are generally faster for data accesses. Thus, while the internal storage device in the graphics processor may support fast data accesses, the external display memory may not be as fast. The inability of the external display memory to handle the fast access requirements of the graphics processor's internal storage device leads to the under-utilization of the graphics processor's memory bandwidth. Furthermore, the graphics processor stores/fetches data from the internal storage device based on the external display memory's technology.

To solve such memory bandwidth problems, some prior art systems implement a tile configured display memory to enable fast access to data blocks in the display memory. In a tile configured memory, data is organized into blocks of bytes of data. Such data blocks enable the graphics processor to perform bit-block transfer (bits) of pixel data to draw graphics primitives as required in the computer system.

However, even such tile configured display memories do not alleviate the associated bandwidth problems that the graphics processor may experience. This is because the graphics processor's internal SRAM storage device may have different timing sequencing and requirements than the tile-configured external display memory device.

Thus, a system in which pixel data can be accessed from an external display memory device having a memory technology different from that of an internal storage device in the graphics processor without incurring an inordinate amount of memory cycles is needed. More particularly, a system wherein the internal storage device's bandwidth can be efficiently utilize in a graphics processor is needed.

SUMMARY OF THE INVENTION

This need and others are substantially met through provision of a method and a system for performing fast pixel data block accesses to memory while maintaining efficient utilization of the local bandwidth of an internal storage device in the graphics processor.

In accordance with the preferred embodiment of the present invention, storage devices internal to a graphics processor are monitored to determine whether data to be stored in the internal memory device must be filled from the X or Y direction of a pixel data in order to implement the fast bit-block data transfer (blt) principles of the present invention. The preferred embodiment of the present invention preferably includes a graphics processor coupled to a system bus for receiving display instructions from a host processor. The host processor provides instructions for pixel data for graphics primitives to be rendered by the graphics processor.

The graphics processor includes an internal static random access memory (SRAM) device about 256 bytes in size and tile configured to store data fetched by the graphics processor from an external memory source. The graphics processor also includes a two/three dimensional (2D/3D) engine which includes a pixel data opposing calculator unit for internally determining whether to fill the internal SRAM from an incremental X position of a graphics object being rendered or from the incremental Y position of the object.

In the preferred embodiment of the present invention, the pixel data opposing unit includes a setup engine for receiving and initializing initial and incremental X,Y pixel data values accessed from the external display memory. The pixel data opposing unit also includes a bit-block (Blt) engine which comprises logic circuitry for determining whether pixel data being stored in the internal SRAM should be filled from the X or Y position of a graphics object being rendered.

A pair of opposing calculators that calculate the optimum size in X and Y enable the blt engine to perform pixel data comparisons in order to fill the internal SRAM with the appropriate data By selectively filling the internal SRAM from either the incremental X or Y position of the current pixel position, the blt engine is able to effectively and efficiently utilize the local bandwidth of the internal SRAM no matter what the external display memory's architecture is configured to be.

Accordingly, the present invention is able to fetch and store requests in a lesser number of memory cycles than the prior art's sequential method of accessing pixel data. This and further advantages of the present invention will become apparent upon reading the detailed description which follows.

BRIEF DESCRIPTION OF THE DRAWINGS

A better understanding of the present invention can be obtained when the following detailed description of the preferred embodiment is considered in conjunction with the following drawings in which:

FIG. 3 is a block diagram illustrating how the display memory of FIG. 2 is organized on a scan line basis;

FIG. 4 is a simplified block diagram illustrating how the display memory of FIG. 2 is organized in a tile;

DETAIL DESCRIPTION OF THE PRESENT INVENTION

In the following detailed description of the present invention, numerous specific details are set forth in order to provide a thorough understanding of the present invention. However, it will be obvious to one skilled in the art that the present invention may be practiced without these specific details or by using alternate elements or method. In other instances well known methods, procedures, components and circuits have been described in detail as not to unnecessarily obscure aspects of the present invention.

Some portions of the detailed description which follow are represented in terms of procedures, logic blocks, processing and other symbolic representations of operations on data bits within a computer system. These descriptions and representations are the means used by those skilled in the art to most effectively convey the substance of their work to others skilled in the art. A procedure, logic block, process etc., is herein, and generally, conceived to be a self-consistent sequence of steps or instructions leading to a desired result.

The steps are those requiring physical manipulations of physical quantities. Usually, signals capable of being stored, transferred, combined, compared, and otherwise manipulated in a computer system. For reasons of convenience, and with reference to common usage, these signals are referred to as bits, values or the like with reference to the present invention.

It should be borne in mid, however, that all of these terms are to be interpreted as referencing physical manipulations and quantities and merely convenient labels and are to be interpreted further in view of terms commonly used in the art. Unless specifically stated otherwise as apparent from the following discussions, it is understood that thorough discussions of the present invention, discussions utilizing terms such as "processing" or computing" etc. refer to the action and processes of a computer system, or similar electronic computing device, that manipulates and transforms data.

Figure 2:
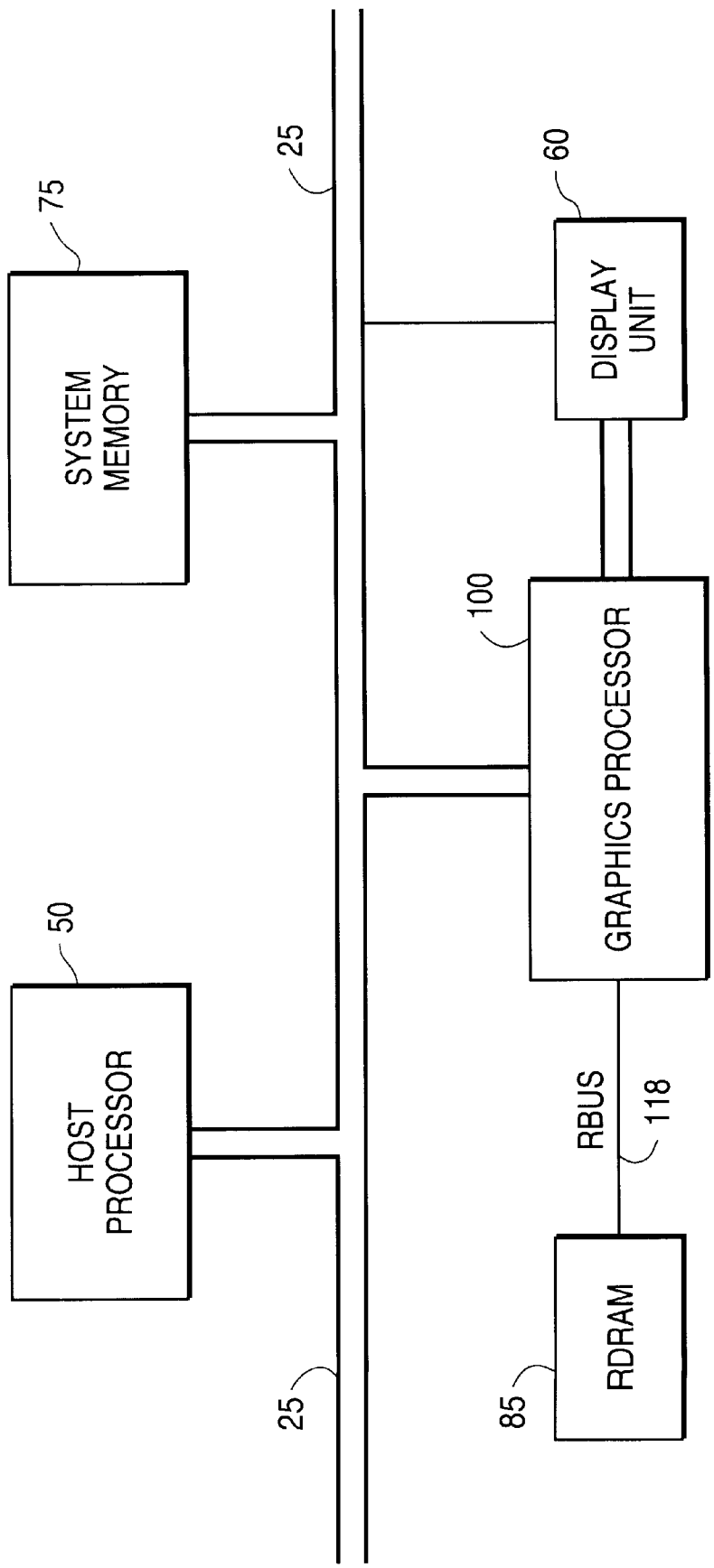
FIG. 2 is a simplified diagram of computer system in accordance with the principles of the present invention.

Referring now to FIG. 2, the present invention relates generally to a software based graphics system for a personal computer (PC) capable of rendering graphics primitives and associated texture either in two dimension (2-D) or three dimension (3-D). As shown in FIG. 2, the computer system generally includes a host processor 50 and system memory 75 coupled to a system bus 25, a graphics processor 100, a frame buffer, such as an RDRAM array 85, and a display unit 60. The host processor 50 may comprise the control processing unit of a PC, while system memory 75 may comprise the working memory, or random access memory array of the PC. The host processor 50 preferably includes a software driver for generating display parameters for the graphics primitives to be rendered by the graphics processor 100. Thus, for example, the software driver may identify the spatial location of lines, points of vertexes of polygons. The host processor 50 or software driver may also generate an operational code instruction which defines the type of primitive to be rendered. The software driver is preferably loaded into the system memory 75 from a magnetic storage device, such as a hard drive or a CD ROM drive device. Once loaded the software driver is executed by the host processor 50.

It should be understood that the particular embodiment shown in FIG. 2 is only one of many possible implementations of a graphics system for use in a personal computer system.

FIG. 2 is simplified for purposes of clarity as that many components and control signals are omitted which are not necessary to understand the present invention. In the preferred embodiment, O the graphics processor is software based and provides support for 2D and 3D graphics. The graphics processor 100 operates with a software driver in the host processor 50 and system memory 75 to process data for storage in the RDRAM 85 ultimately for display on the display device 60.

In accordance with the present invention, the host processor 50 may provide necessary parameter values in the form of a display list which typically is stored in system memory 75 until required by the driver routines in the graphics processor 100.

Figure 1:
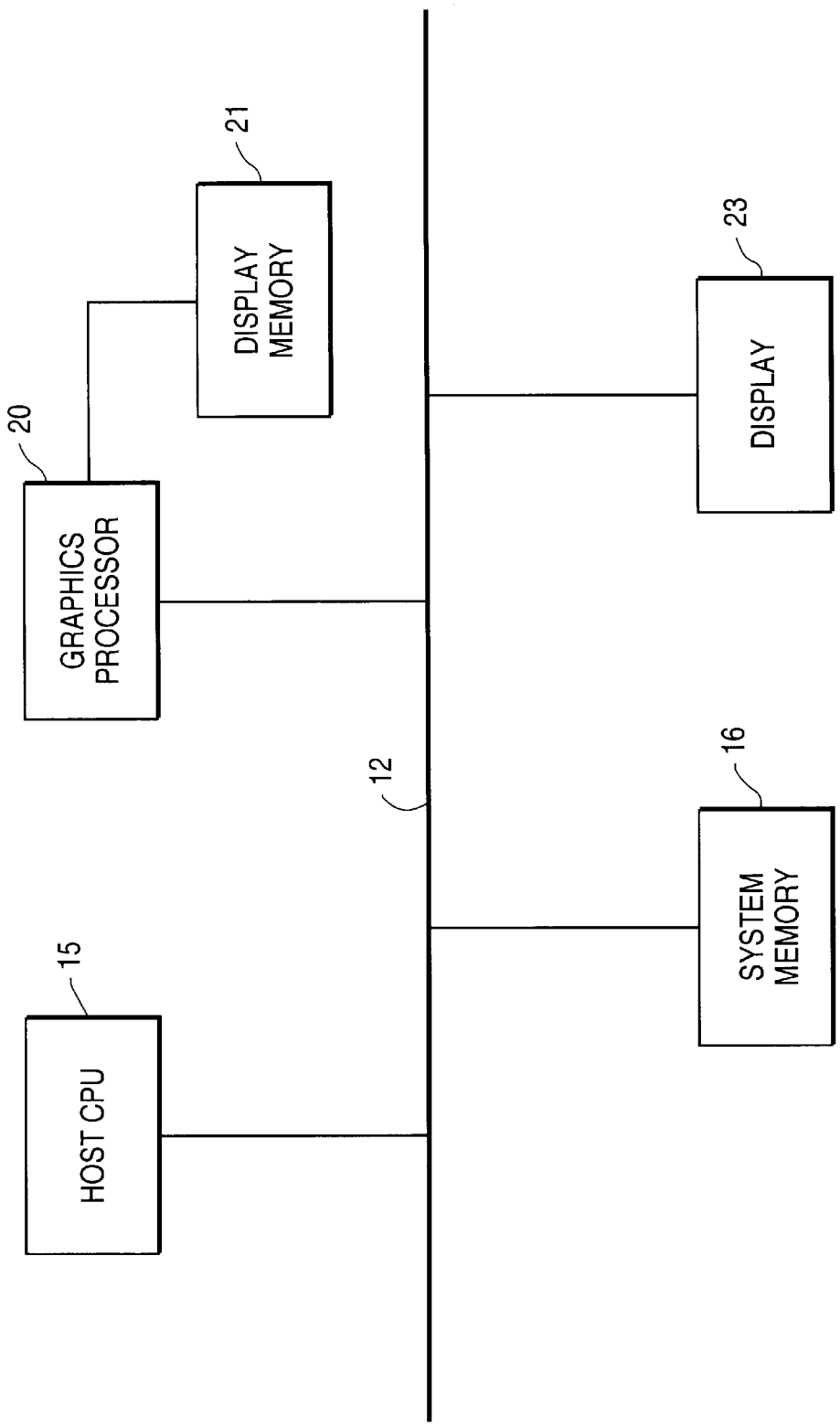
FIG. 1 is an exemplary diagram of a prior art computer system.

Referring still to FIG. 2, the graphics processor 100 preferably couples to the system bus 25. In accordance with preferred embodiment, the graphics processor 100 preferably includes bus mastering capabilities, thus permitting graphics processor 100 to obtain mastership of the system bus 25. As shown in FIG. 1, graphics processor 100 also couples to a display unit 60 and to RDRAM 85. The graphics processor communicates to the RDRAM 85 through address data and control lines collectively referred as RBUS 118. The display unit 60 may be any suitable type of display device, such as a cathode ray tube (CRT) for desktop computers or a host of other display devices.

FIG. 3 shows display memory (RDRAM) 85 organized on a scan line basis. The display memory 85 shown in FIG. 3 illustrates how an individual pixel data is stored within display memory 85. The addresses shown in FIG. 3 are for illustration purposes only.

The display memory 85 shown in FIG. 3 shows a row size of 2048 bytes. Thus, data for two scan lines for display 60 can be stored either one row of display memory 85. Each pixel Pxy can be stored in a different byte location in display memory 21 where x represents scan line number (1–768) and y represents pixel location (1–1024). Each scan line to displayed on display 60 may be stored within a page or pages of display memory 85 allowing for the use of page mode addressing when outputting data. Such an ordering technique allows for quick sequential output of pixel data to display 60. When data is to be retrieved from display memory 85 to refresh display 60, individual pixel data is retrieved in successive fashion from display memory 85 using page mode access.

However, with the advent of advanced graphics applications, such sequential scan-line based addressing scheme creates a bottleneck when data is written to the display memory 85. Graphics operations have certain characteristics which are different than other memory applications in that graphics operations tend to be either two or three dimensional. Graphics operations on a pixel frame buffer generally fall into two classes those which access the frame buffer in raster scan order and those which access the frame buffer in random accesses.

As discussed above, raster scan line accesses may be made in a page mode if display memory 85 is organized in a raster scans formation. However, random access may force page misses. In such situations in the prior art, the host CPU 50 may take a block of data to be updated to display memory 85 and translate the pixel addresses to correspond to display memory addresses. The CPU then transfers such data to display memory addresses, before transferring such data to display memory 85 during a CPU cycle. This also results in an inefficient use of the internal SRAM's local bandwidth.

FIG. 4 illustrates a display image and memory organization for a tile image. In the tile architecture shown in FIG. 4, a memory map of display memory 85 using a tiled addressing mode is illustrated. In the example of FIG. 4, display memory 85 is provided with a row size of two kilobytes (2048 bytes) and display 60 is configured having a 1024—768 resolution of 8 bits per pixel. These resolution and memory sizes are used by way of illustration only and are not intended to limit the scope of the present invention.

In the example illustrated in FIG. 4, each row of display memory 85 contains data for each individual tile. Each tile comprises 128×16 pixels or 2048 pixels. Each pixel in FIG. 4, for a tile is represented by P2xy where 2 represents the tile number (0–383), x the row number in the tile (1–16) and y the pixel position within a row (1–128).

In the tile configured memory shown in FIG. 4, the graphics processor 100 is able to fetch pixel data faster than in a scan line formatted memory, thereby reducing the host CPU's cycle time. However, the tile configured display memory increases the complexity of addressing when outputting pixel data to display 63. The increased complexity is, however, more than compensated by the decreased complexity in transferring blocks of images from host CPU 50. If host CPU 50 is to transfer a block of pixel data within a tile boundary, such a transfer takes place almost entirely in page mode. The use of tiling reduces the CPU cycle time, depending on the particular tile size and applications being executed. For example, transfers of text data may perform optimally with long, narrow tiles sized to cover a line or other graphics primitives. Graphics images on the other hand, may not perform optimally using the same tile characteristics and thus hampers the effective and efficient use of the graphics processor 100 internal storage device.

As discussed above, the tile size of a tile in display memory 85 may be determined by the architecture of the display memory 21. For example, in the preferred embodiment, a RAMBUS™ DRAM is provided having a row width of 2048 bytes and thus the tile size may be limited to 2048 bytes or 2048 pixels at 8 bits-per-pixel depth. Despite the difference in tile sizes between display memory 85 and internal SRAM, the present invention is able to handle data transfers between display memory 85 and internal SRAM without under utilizing the internal SRAM's local bandwidth.

Figure 5:
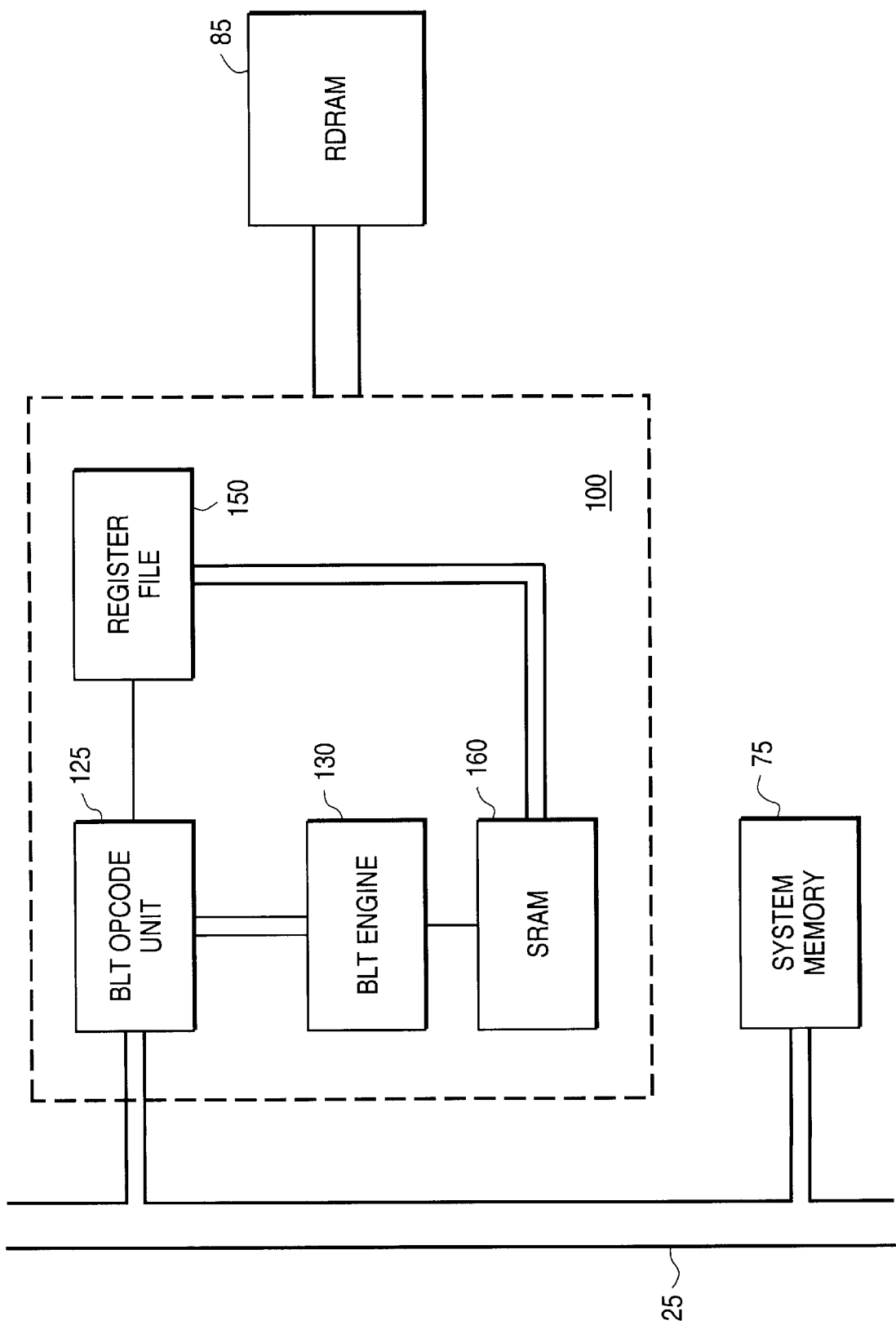
FIG. 5 is a simplified block diagram showing in more detail the graphics processor of FIG. 2.

Referring now to FIG. 5, the graphics processor 100 in accordance with the preferred embodiment of the present invention is shown. The graphics processor 100 preferably includes a bit-block (blt) operational code (opcode) unit 125, a blt engine 130, a register file 150 and an internal static random access memory (SRAM) 160. The graphics processor 100 may also include other components which are not shown here in order not to obfuscate the teachings of the present invention.

The blt opcode unit 125 is coupled to store the opcode instructions defining the pixel data to be processed in the blt engine 130. In the preferred embodiment, the bit opcode unit 125 is preferably 32 bits in size and it stores the opcode instruction itself and any associating instruction defining the data to be blted.

The bit engine 130 is coupled to the opcode unit 125 to selectively process and generate the X or Y pixel data to the SRAM 160. The bit engine includes logic for calculating the opposing X or Y fillers for a graphics primitive being displayed on display 60 (FIG. 2). The operation and function of the bit engine 130 is described in detail with reference to FIG. 6 below.

The SRAM 160 is coupled to the bit engine 130 to store the incremental X or Y coordinate data provided by the bit engine 130 during a bit operation. In the preferred embodiment of the present invention, the SRAM 160 is preferably 256 bytes in size.

Figure 6:
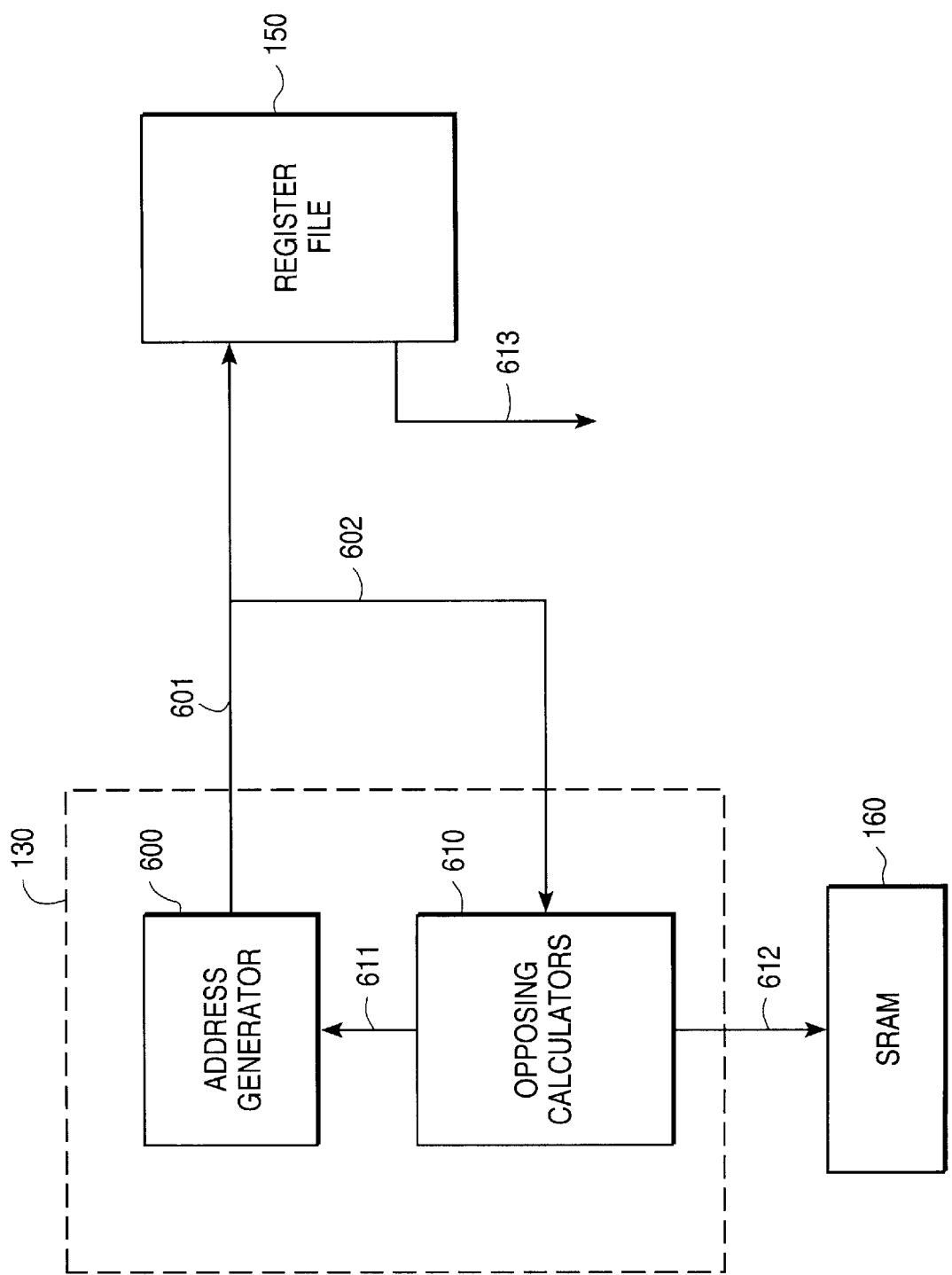
FIG. 6 is a simplified diagram of the bit-block engine of the graphics processor of FIG. 5.

Referring now to FIG. 6 the bit engine 130 is shown to comprise an address generator 600 and opposing XY calculator engine 610. As one of ordinary skill in the art would know, the bit engine 130 may include other elements not shown in FIG. 6.

The address generator 600 generates a pixel address for a display image to the opposing XY calculator engine 610 and transmits the address over signal line 601. The data in the address generated is then written to the SRAM 160 for subsequent transmission to the display unit.

Opposing XY calculator engine 610 receives pixel data including an operational code instruction which includes an opcode which establishes which register in the register file 150 is necessary to render a corresponding primitive.

In the preferred embodiment, the opposing XY calculator engine 610 selectively fills the SRAM 160 with pixel data of a primitive being drawn regardless of the characteristics of the RDRAM 85 or for that matter any external display memory of the graphics processor 100. The selective filling of the SRAM 160 allows the graphics processor 100 to effectively and efficiently utilize the SRAM 160 local bandwidth.

Figure 7:
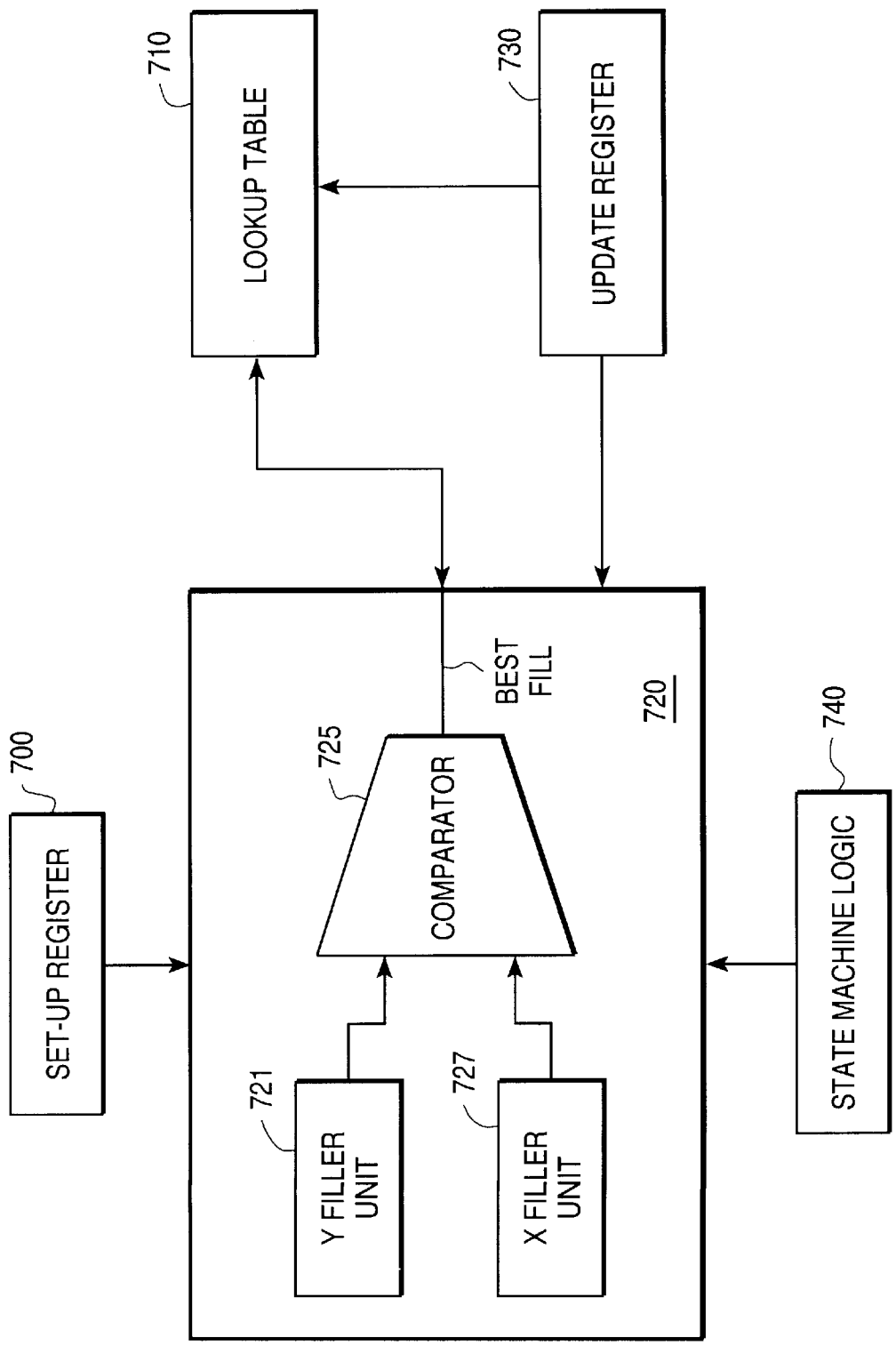
FIG. 7 is a simplified block diagram of the graphics processor of FIG. 5 showing the pixel data filler engine of the present invention.

Referring now to FIG. 7, the bit-block (bit) engine 130 incorporating the opposing XY calculator 610 of the present invention is shown. The opposing XY calculator engine 610 includes a tiling engine 700, a lookup table 710, a bit-block (blt) engine 720 and an update register unit 730. The opposing XY calculator 610 further includes a state machine logic 740.

The tiling engine 700 is coupled to the lookup table 710 and bit engine 720 to receive and initialize the initial and increment values of pixel data provided to the graphics processor 100 for internal storage in the internal SRAM 160. In the preferred embodiment of the present invention, the incremental pixel data values represent the X extent and Y extent pixel data values of the current pixel being rendered in the computer system of FIG. 2. The initial pixel data values are initialized upon an initial request by the graphics processor 100 to store data in the internal SRAM 160. After initialization, the tiling engine 700 provides the incremental X,Y pixel data values to the bit engine 720 depending on whether the bit engine is filling the internal SRAM 160 either in the X or Y direction of the current pixel position.

The lookup table 710 is coupled to the internal bus 701 in the pixel data opposing engine to store the data value representing the maximum size of data that can fill the internal SRAM 160. In the preferred embodiment of the present invention, the value store in the lookup table is 256 which represents the maximum size of the internal SRAM 160 (e.g. 256 bytes). The value stored in the lookup table 720 is used by the bit engine 720 to determine whether a store request to the internal SRAM 160 is larger than the internal SRAM size.

The lookup table 710 is a modulous table which allows the inputs of the lookup table 710 to be divided by the value of the inputs of the X filler or the Y filler in the bit filler engine 720 to determine the maximum number of pixels to fill the internal SRAM 160. The lookup value enables the bit filler engine 720 to determine whether an X fill (i.e., incremental pixel data of a graphics object being rendered is stored in an incremental position from the current pixel in the X direction) or a Y fill operation should be performed when rendering incremental pixel data for a given graphics object.

The bit filler engine 720 couples to the bus 701 to receive X,Y pixel data values from the tiling engine 700. The bit filler engine 720 comprises a X fill unit 727 and a Y fill unit 722 to fill data in the X and Y direction respectively. The bit filler engine 720 further comprises logic circuit to selectively determine whether data must be filled from the X or Y fill units. The blt filler engine 720 further comprises compare logic which enables the blt filler engine 720 to compare the value of the contents of either the X filler unit 727 and the Y filler unit 722 with the contents of the lookup table 710 to determine the number of pixels needed to fill the internal SRAM 160 and the filler unit to use. The filler unit with the highest number of pixels as a result of the compare logic fills the internal SRAM 160.

Figure 8:
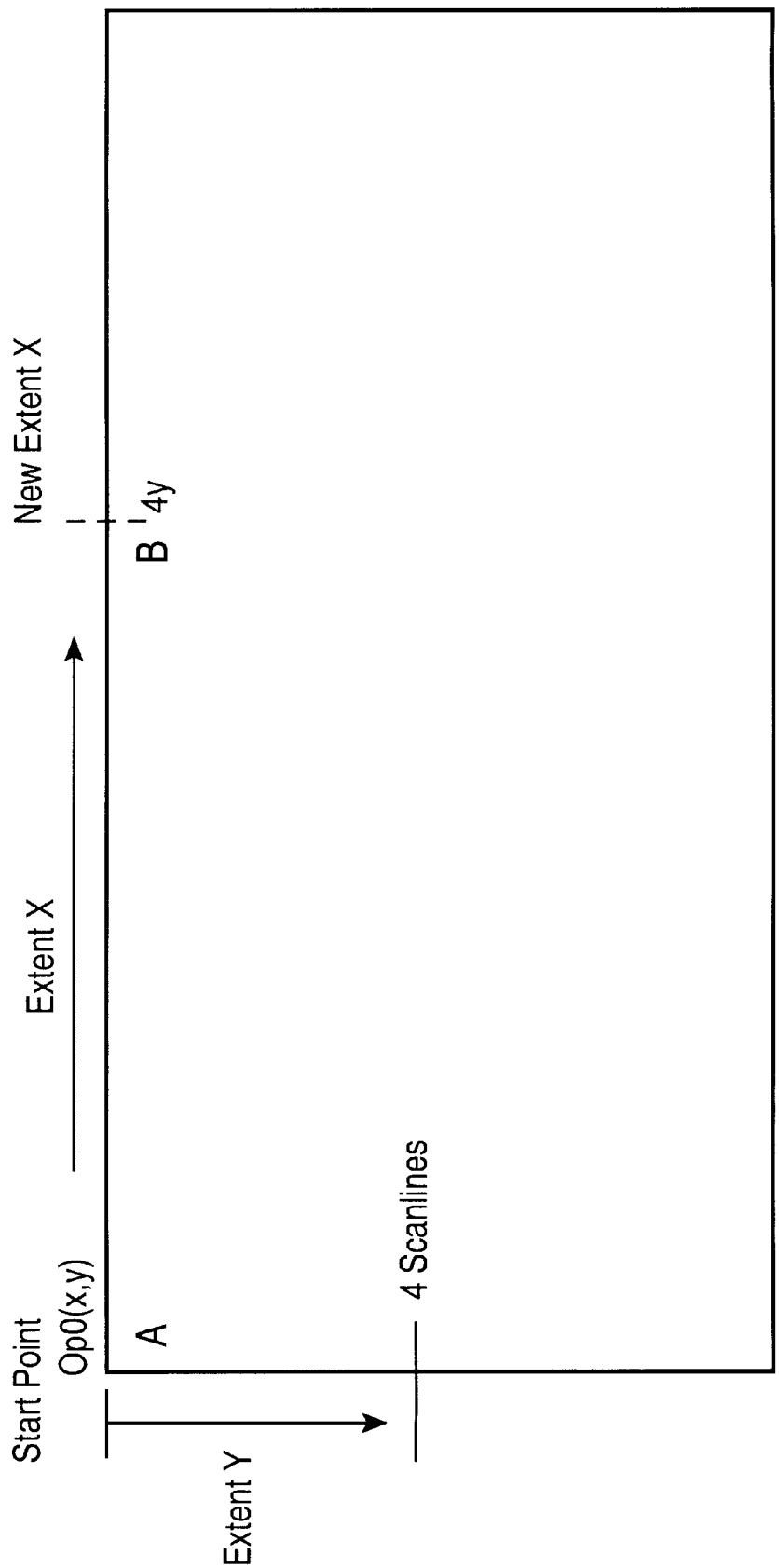
FIG. 8 shows an exemplary illustration of how the internal SRAM of FIG. 2 is filled by the bit engine of FIG. 6

To fill the internal SRAM 160, the bit filler engine 720 calculates the maximum X and Y extents of the current pixel being rendered as shown in FIG. 8, compares the calculated maximum extent values with the contents of the lookup table 710 to determine whether either one of the maximum extents is larger than the contents of the lookup table 710. As a result of the comparison, the bit filler engine 720 consequently determines whether to fill data from the X or Y extent.

An exemplary code excerpt for implementing the bit engine in Verilog™ to generate the appropriate circuitry representing the bit engine is illustrated as follows:

```
s_calc_majors: begin
   if [tile_size_256]begin
   if [{current_ext_y == 0] || [current_ext_x == 0}] begin
      done = 1'b1;
      state = s_idle;
   end
   else begin
      if ((current_start_y[3:0] + mod_32_current_ext_y) > 8)
begin
         major_x_ext_y = 8 - current_start_y[3:0};
      end
      else begin
         major_x_ext_y - mod_32_current_ext_x;
      end
      if [(current_start_x[3:0] + mod_32_current_ext_x) . 8)
begin
         major_y_ext_x = 8 - current_start_x[3:0];
      end
      else begin
         major_y_ext_x = mod_32_current_ext_x;
      end
      state = s_calc_major_sizes;
   end
end
else begin
   if ((current_ext_y == 0) || ( current_ext_x == 0) ) begin
      done = 1'b1;
      state = s_idle;
   end
   else begin
      if ((current_start_y[3:0] + mod_32_current_ext_y) . 16)
begin
         major_x_ext_y = 16 - current_start_y[3:0];
      end
      else begin
         major_x_ext_y = mod_32_current_ext_x;
      end
```

-continued

```
    if ((current_start_x[3:0] + mod_32_current_ext_y) > 16 )
begin
        major_y_ext_x = 16 - current_start_x[3:0];
        end
        else begin
        major_y_ext_x = mod_32_current_ext_x;
        end
        state = s_calc_major_sizes;
        end
    end
end
```

Referring still to FIG. 7, the state machine 740 is coupled to the blt engine 720 to logically control the various operating states of the bit engine 720. In the preferred embodiment of the present invention, the operating states of the blt engine 720 preferably includes an idle state in which the bit engine 720 is not generating any XY fill data.

The state machine also includes a calculate_major_size control state in which the compare logic in the bit engine is calculating the maximum extent in X that a Y fill may fill or the maximum extent in Y that a X fill may fill. A third calculate_winner state controls the generating of the best fill in the Y or X direction by the bit engine 720 to fill the SRAM 160 from either the Y filler unit 721 or the X filler unit 727.

FIG. 8 is an exemplary depiction of one embodiment of the data filling operation of the present invention. In the example shown in FIG. 8, a pixel having a starting position of A with pixel coordinates (0,0) is shown. In a subsequent rendering of pixel data to generate pixel B, the bit engine 720 determines which is the best fill position for the pixel. In the example shown in FIG. 8, if we assume that a subsequent rendering of data in the X direction to get to pixel B is five (5) bytes (i.e. X extent is 5 bytes) and the incremental Y directional data is four (4) scanlines and a SRAM size of 256 bytes, then to determine whether to fill in the X or Y direction the compare logic 725 will have to perform the following calculations and comparisons:

First to determine whether to fill in the Y or X direction, the comparator divides the SRAM size (e.g., 256 bytes) by the length of the X extent (e.g. 5 bytes) and the length of the Y extent (e.g. 4 scanlines). This calculation results in 51 scanlines in Y (e.g., 256/5) for the X extent calculation and 64 bytes in X for the Y extent calculation. Since the result of the Y extent calculation is greater than the X extent calculation, the blt engine fills the SRAM 160 with the contents of the Y filler (e.g., fill 4 scanlines in Y by 64 bytes in X). The calculation and comparison to determine which filler unit to use to fill the SRAM continues until the blt engine has completed a blt operation.

While preferred embodiments of the invention have been described with a certain degree of particularity with reference to the drawings, obvious variations and modifications will become apparent to those skilled in the art once the above disclosure is fully appreciated. It is intended that the following claims be interpreted to embrace all such variations and modifications.

What is claimed is:

1. A graphics processor for receiving and internally storing pixel data from an external display memory, the graphics processor comprising:

an internal memory for temporarily storing pixel data internally in the graphics processor;

a pixel data filler coupled to the internal memory for selectively storing the pixel data accessed from the external display memory, the pixel data filler including a first storage unit for storing pixel data for filling Y position data in the internal memory and a second storage unit for storing pixel data for filling X position data in the internal memory; and a lookup register disposed within the pixel data filler for storing size data representing the size of the internal memory.

2. The graphics processor of claim 1, wherein the pixel data filler includes a first register for storing initializing data for initializing and setting up the pixel data filler.

3. The graphics processor of claim 2, wherein the pixel data filler further includes a bit-block data engine for selectively filling the internal memory with X, Y pixel position data.

4. The graphics processor of claim 3, wherein the pixel data filler further includes a second register for storing pixel data for updating the contents of the data engine.

5. The graphics processor of claim 4, wherein the pixel data filler further includes a pixel data incremental/decremental register coupled to the lookup register for incrementing/decrementing the contents of the data engine.

6. The graphics processor of claim 3, further including a state machine coupled to the data engine for controlling the operating states of the data engine.

7. The graphics processor of claim 6, wherein the state machine includes an idle state in which the data engine is not generating any pixel data.

8. The graphics processor of claim 7, wherein the state machine further includes a calculate maximum fill state in which the data engine calculates incremental fill data in the X and Y position of a pixel rendered.

9. The graphics processor of claim 8, wherein the state machine further includes a calculate winner fill state in which the data engine determines whether to fill data in the Y or X position in the internal memory.

10. The graphics processor of claim 9, wherein the data engine further includes a data fill determining means coupled to the first and the second storage units for selectively indicating whether the pixel data must be filled from the first or the second storage unit.

11. A computer system for selectively generating pixel data representing a display image, the computer system comprising:

a system bus for communicating data;

a host processor coupled to the system bus for processing and generating display image data;

a graphics processor coupled to the system bus for internally storing and generating the pixel data representing the display image;

an external display memory coupled to the system bus and the graphics processor for storing the pixel data generated by the host processor and the graphics processor for rendering to a display device;

an internal static random access memory (SRAM) disposed in the graphics processor for temporarily storing the pixel data processed by the graphics processor; and a pixel data filler disposed within the graphics processor and coupled to the internal SRAM for selectively filling the internal SRAM with X position pixel data or Y position pixel data of a display image.

12. The computer system of claim 11, wherein the internal SRAM is 128 bytes wide.

13. The computer system of claim 11, wherein the external display memory is tile configured.

14. The computer system of claim 13, wherein the external display memory is scanline configured.

15. The computer system of claim 11, wherein the pixel data filler includes a first storage unit for storing Y position data representing a display image for filling the internal SRAM.

16. The computer system of claim 15, wherein the pixel data filler includes a second storage unit for storing X position data for filling the internal SRAM for the display image.

17. The computer system of claim 16, wherein the pixel data filler includes a selection unit coupled to the first and the second storage unit for selectively determining whether to fill the internal SRAM with the pixel data contained in the first or the second storage unit to efficiently utilize the local bandwidth of the internal SRAM.

18. The computer system of claim 17, wherein the first and the second storage units generate the pixel data contained therein to the internal SRAM in a bit-block fashion.

19. A selective pixel data filler for selectively storing X,Y pixel data internally in a local static random access memory (SRAM) in a graphics processor to efficiently utilize the local bandwidth in the graphics processor, the data filler comprising:
   a setup engine means for receiving and storing initial and incremental X,Y position data values representing a display image;
   a bit-block (blt) engine means coupled to the setup engine means for receiving X,Y pixel data and selectively generating X or Y pixel position data in a bit-block fashion; and
   a register lookup means coupled to the blt engine means for storing size data representative of a temporary internal storage device in the graphics processor.

20. The selective pixel data filler of claim 19, wherein the blt engine means includes a first pixel data filler means for receiving and generating Y pixel position data.

21. The selective pixel data filler of claim 20, wherein the blt engine means further includes a second pixel data filler means for receiving and generating X pixel position data.

22. The selective pixel data filler means of claim 21, wherein the blt engine means further includes a data selection means coupled to the first pixel data filler means and the second pixel data filler means to selectively determine whether data should be generated by the first pixel data filler means or the second pixel data filler means.

23. The selective pixel data filler means of claim 22 further includes a divider logic means for logically dividing the contents of the register lookup means with the contents of the first pixel data filler means and the second pixel data filler means to determine the number of pixels needed to fill the local SRAM.

24. The selective pixel data filler means of claim 23 wherein the blt engine means includes a compare means for comparing the value of the contents of the first pixel data filler means and the second pixel data filler means to determine which one of the pixel data filler means is selected to fill the local SRAM.

25. The selective pixel data filler means of claim 24, wherein the local SRAM is 256 bytes wide.

26. The selective pixel data filler means of claim 25 further including an update register means coupled to the blt engine means for updating the blt engine means.

27. The selective pixel data filler means of claim 26 further including a state machines means coupled to the blt engine means for controlling various states of operation of the blt engine.

28. The selective pixel data filler means of claim 27, wherein the register lookup means is a modulous register table.

29. The selective pixel data filler means of claim 26 further including a shift register means coupled to the blt engine means for indicating when the contents of the blt engine means should be transferred to the local SRAM.

30. A graphics processor for receiving and internally storing pixel data from an external display memory, the graphics processor comprising:
   an internal memory configured to temporarily store pixel data internally in the graphics processor as X position pixel data and, alternatively, as Y position pixel data; and
   a pixel data filler coupled to the internal memory and configured to selectively store the pixel data accessed from the external display memory, the pixel data filler including a lookup register adapted for storing size data representing the size of the internal memory, a first storage unit for storing pixel data for filling Y position data in the internal memory and a second storage unit for storing pixel data for filling X position data in the internal memory.

31. The graphics processor of claim 30, wherein the pixel data filler includes a first register for storing initializing data for initializing and setting up the pixel data filler.

32. The graphics processor of claim 31, wherein the pixel data filler further includes a bit-block data (blt) engine for selectively filling the internal memory with X, Y pixel position data.

33. The graphics processor of claim 32, wherein the pixel data filler further includes a second register for storing pixel data for updating the contents of the data (blt) engine.

34. The graphics processor of claim 33, wherein the pixel data filler further includes a pixel data incremental/decremental register coupled to the lookup register for incrementing/decrementing the contents of the data blt engine.

35. A method of storing pixel data from an external display memory to an internal memory of a graphics processor, comprising:
   storing, in a first storage unit, pixel data for filling Y position data in the internal memory and, in a second storage unit, pixel data for filling X position data in the internal memory
   storing pixel data internally as X position pixel data and, alternatively, as Y position pixel data in the internal memory of the graphics processor; and
   storing size data representing the size of the internal memory.

* * * * *